United States Patent [19]
Henman et al.
[11] B 3,997,503
[45] Dec. 14, 1976

[54] POLYMER COMPOSITION

[75] Inventors: Terence John Henman, Haslingfield; Graham Williams, Hitchin, both of England

[73] Assignee: Imperial Chemical Industries Limited, London, England

[22] Filed: Nov. 12, 1973

[21] Appl. No.: 415,122

[44] Published under the second Trial Voluntary Protest Program on February 10, 1976 as document No. B 415,122.

[30] Foreign Application Priority Data

Nov. 27, 1972 United Kingdom ............ 54674/72

[52] U.S. Cl. ............................ 260/42.15; 156/334; 260/42.14; 260/42.16; 260/42.18; 260/42.45; 260/42.46; 260/878 R

[51] Int. Cl.[2] ...................... C08K 3/30; C08K 7/14

[58] Field of Search ......... 260/42.45, 42.14, 42.15, 260/42.18, 42.16, 42.46, 878 R

[56] References Cited

UNITED STATES PATENTS 3,579,476 5/1971 Rieke et al. .................. 260/42.18

FOREIGN PATENTS OR APPLICATIONS 1,095,700 12/1967 United Kingdom
1,174,943 12/1969 United Kingdom

*Primary Examiner*—James H. Derrington
*Attorney, Agent, or Firm*—Cushman, Darby & Cushman

[57] ABSTRACT

A blend of at least one boron, phosphorus or sulphur containing acid which may contain amino, hydrocarbyl or hydrocarbylamino substituents and a polypropylene/unsaturated carboxylic acid or anhydridge graft copolymer has adhesive properties similar to those of the graft copolymer alone. The blend is readily produced and can be used in a fibre reinforced thermoplastic material or in blends of an olefine polymer with a different type of polymer such as a polyamide or polyester. Suitable acids include phenyl boric acid, phenylphosphonic acid, diphenylphosphinic acid, sulphanilic acid, toluene sulphonic acid, phenylhydrazine-p-sulphonic acid, d-10-camphor sulphonic acid, orthanilic acid, hypophosphorus acid, sulphosalicylic, and particularly sulphamic acid. The graft copolymer is preferably a polypropylene/maleic anhydride graft copolymer.

11 Claims, No Drawings

POLYMER COMPOSITION

The present invention relates to polymer compositions and in particular to compositions suitable for promoting adhesion between polyolefines especially polypropylene, and other materials.

The polymers and copolymers of the olefine monomers possess a useful combination of mechanical properties coupled in many cases with chemical inertness to many environments. The polymers of ethylene and propylene are used extensively commercially in view of their useful combination of properties. However, although the chemical inertness of these polymers is very desirable and useful in many applications, this inertness makes it difficult to form a bond between the olefine polymer and another material. Adhesives have been developed to overcome this difficulty, and such adhesives include graft copolymers obtained by grafting, onto an olefine polymer, an ethylenically unsaturated monomer containing at least one carboxylate group.

According to the present invention there is provided a polymeric composition which comprises a blend of (a) a graft copolymer obtained by grafting an unsaturated dicarboxylic acid or the anhydride thereof onto a propylene polymer and (b) at least one compound selected from sulphur-containing acids having the formula I, phosphorus-containing acids having the formula II, and boron-containing acids having the formula III, $$RSO_nH \quad \text{I}$$
$$R'R''PO(OH) \quad \text{II}$$
$$RB(OH)_2 \quad \text{III}$$

wherein 1–90 percent of the acid moieties of the blend are present in the acid and/or anhydride component of the graft copolymer, R is $NR_2'''$, a hydrocarbyl group, or a substituted hydrocarbyl group and when the compound b) is an acid of formula I and the group is an aromatic group, any substituent containing an atom other than carbon, hydrogen or oxygen is located in a position which is other than meta- to the $—SO_nH$ group;

R' is hydrogen or substituted or unsubstituted hydrocarbyl;

R'' is OH or a group R';

R''' is H or a hydrocarbyl group; and

*n* is 2 or 3;

except that R' is not hydrogen when R'' is OH.

A wide range of acids of boron, phosphorus or sulphur can be used as component (b) of the blend. Thus, component (b) can be a boric acid derivative such as phenyl boric acid. Alternatively, the acid can be a sulphonic acid derivative containing an, optionally substituted, amino group, such as phenylhydrazine-p-sulphonic acid or particularly sulphamic acid. Other suitable sulphonic acids include the hydrocarbyl sulphonic acids such as p-toluene sulphonic acid and naphthalene-2-sulphonic acid, and the substituted hydrocarbyl sulphonic acids such as sulphosalicylic acid (3-carboxy-4-hydroxy-benzene-sulphonic acid), d-10-camphor sulphonic, orthanilic and sulphanilic acids. The sulphur-containing acid can be a sulphinic acid such as phenyl sulphinic acid. Suitable phosphorus-containing acids include hypophosphorous, phenyl phosphonic and diphenylphosphinic acids.

If a sulphur-containing acid is used as component (b) of the blend, the group R is conveniently a substituted aryl group particularly one having no more than two substituent groups attached to any one ring, for example a 3-carboxyl-4-hydroxy-phenyl, p-aminophenyl or p-tolyl group. Alternatively the group R is very conveniently the amino-group $—NH_2$.

If a phosphorus-containing acid is used, at least one of the groups R' and R'' is conveniently an aryl group. Alternatively, both the groups R' and R'' are very conveniently hydrogen.

Component (a) of the blend can be any graft copolymer which is effective as an adhesive, such copolymers including the product of grafting maleic acid, itaconic acid, maleic anhydride or $\Delta^4$-3,6-endomethylene-tetrahydrophthalic anhydride onto a propylene polymer. Graft copolymers of maleic anhydride and a propylene polymer are available commercially and are thus particularly convenient for use as component (a) of the blend.

Thus, as a further aspect of the present invention there is provided a polymeric composition comprising a blend of (a) a graft copolymer obtained by grafting maleic anhydride onto a propylene polymer and (b) at least one compound selected from sulphur-containing acids having the formula I, phosphorus-containing acids having the formula II, and boron-containing acids having the formula III $$RSO_nH \quad \text{I}$$
$$R'R''PO(OH) \quad \text{II}$$
$$RB(OH)_2 \quad \text{III}$$

wherein 1 to 90 percent of the acid moieties of the blend are present in the maleic anhydride of the graft coploymer, and R, R', R'' and *n* are as hereinbefore defined.

Preferably from 25 up to 80 percent of the acid moieties are present as the acid and/or anhydride component of the graft copolymer.

The propylene polymer, onto which the unsaturated dicarboxylic acid of anhydride is grafted, is preferably a crystalline polymer and may be a homopolymer or a copolymer with a minor proportion, for example up to 25 percent by weight, of another olefine monomer, such as ethylene.

The blend can be used in a similar manner to the graft copolymer alone either as an adhesive or to improve compatibility between materials and we have found that the properties of some blends are very similar to those of the graft copolymer alone. The blend can be used to provide bonding between a propylene polymer and an inorganic filler such as a glass fiber as described in British Patent Nos. 1,095,700 and 1,174,943. The blend can be used in the production of a filled polymer composition using any suitable technique for producing such compositions and is particularly useful when used to produce a fiber reinforced thermoplastic material, for example glass fiber reinforced polypropylene using the process of German Pat. application No. 2,117,095.

Alternatively, the blend can be used to improve the compatibility between two materials, particularly plastics materials, and is especially useful for improving compatibility between an olefine polymer, such as an ethylene polymer or particularly a propylene polymer, and another polymer, such as a polyamide or polyester, which is not readily compatible with the olefine polymer.

The effectiveness of the blend as an adhesive is very conveniently determined by measurement of the tensile strength of a moulding formed from a composition comprising glass fiber, a propylene polymer and the blend. Mouldings are formed using only the grafted polymer as an adhesive and also using a blend of one or more boron-, sulphur- or phosphorus-containing acids and the grafted polymer as an adhesive. The tensile strengths of the mouldings are determined and the difference between the tensile strengths gives an indication of the effectiveness of any particular acid. An improvement of less than 0.3 kpsi in tensile strength is not regarded as being a significant improvement. An improvement of at least 0.3 kpsi indicates that the acid is effective in improving adhesive and materials giving improvements in this range include phenyl boric acid, orthanilic acid, sulphanilic acid, p-toluene sulphonic acid, phenylhydrazine-p-sulphonic acid, d-10-camphor sulphonic acid, naphthalene-2-sulphonic acid, phenyl phosphonic acid, diphenylphosphinic acid and phenyl sulphinic acid. It is preferred that the improvement obtained should be greater than 1.5 kpsi and such an effect can be obtained with hypophosphorous, sulphamic and sulphosalicylic acids.

The blend of the present invention is particularly useful for inclusion in filled propylene polymers.

According to a further aspect of the present invention there is provided a composition comprising an inorganic filler, a crystalline propylene polymer and a blend of (a) a graft copolymer obtained by grafting an unsaturated dicarboxylic acid or the anhydride thereof, preferably maleic anhydride, onto a propylene polymer, and (b) at least one compound selected from sulphur-containing acids having the formula I, phosphorus-containing acids having the formula II and boron-containing acids having the formula III $$RSO_nH \qquad I$$

$$R'R''PO(OH) \qquad II$$

$$RB(OH)_2 \qquad III$$

wherein in said blend 1 to 90 percent, and preferably between 25 and 80 percent, of the acid moieties are present as the acid or anhydride component of the graft copolymer, and R, R', R'' and *n* are as hereinbefore defined.

Such a composition can be used in the manner well known in the art for the production of injection moulded articles and the like, for example fans, impellers, filters and motor car components.

The inorganic filler is conveniently a fibrous reinforcing material such as glass fiber. If the filler is glass fiber it should be coated with a silane containing at least one substituent which is reactive with the filler and at least one acid reactive organic substituent. The substituent which is reactive with the filler may be hydroxy, alkoxy, or halide and is preferably hydroxy or alkoxy. The acid reactive organic substituent may be epoxy, hydroxy, amino, hydroxyalkyl, isocyanate or mercapto and is preferably hydroxy, epoxy or amino. Silanes which can be used to coat the filler include epoxyethyltriethoxy silane, γ-glycidoxypropyltrimethoxy silane, glycidoxyethyltriethoxy silane, 1,2-epoxybutyltriethoxy silane, 1,2-epoxybutoxy-propyltriethoxy silane, β-(3,4-epoxycyclohexyl) ethyltrimethoxy silane, γ-aminopropyltriethoxy silane, aminoethyltriethoxy silane, γ-aminobutyltriethoxy silane and bis(β-hydroxyethyl)-γ-aminopropyltriethoxy silane.

The blend of one or more of boron-, sulphur- and phosphorus-containing acids and grafted propylene polymer may be prepared by any of the known blending techniques. A suitable technique is to dissolve the acid in a suitable solvent, preferably one having a low boiling point, mix the solution of acid with the solid graft copolymer and then evaporate off the volatile solvent. Suitable solvents for this purpose include water, acetone, benzene, ethyl acetate and chloroform. Many suitable acids are solid materials and for such materials a conventional solid mixing technique, for example using a high speed mixer, can be used to produce the blend.

The graft copolymer can be prepared using any of the known techniques. Suitable methods for carrying out grafting include radiation grafting, solution grafting using a free radical initiator and/or an oxidised polymer, extrusion grafting or fluidised bed grafting. Using an extrusion grafting technique it is preferred to use a free radical initiator but under the conditions used some grafting may result from the presence of a minor proportion of oxygen which is present in the polymer. Graft copolymers containing an acid, for example maleic acid, can be prepared either by grafting the acid onto a propylene polymer or by the hydrolysis of a graft copolymer of a propylene polymer and a suitable derivative of the acid such as an anhydride of the acid, for example a maleic anhydride graft copolymer can be hydrolysed to give a maleic acid graft copolymer.

When the graft copolymer is one containing grafted maleic anhydride, it should contain at least 0.01 percent and preferably at least 0.4 percent by weight of grafted maleic anhydride. In general graft copolymers containing more than 6 percent by weight of grafted maleic anhydride do not have significantly better properties than polymers with a lower content of grafted maleic anhydride. Depending on its method of preparation and purification, the graft copolymer may contain a proportion of free unsaturated dicarboxylic acid or anhydride and such a material can be used as component (a) of the blend of the present invention.

When using a blend of an acid and a maleic anhydride graft copolymer, although a significant improvement (compared to the acid alone) is obtained with only 25 percent by weight of the acid moieties present as the maleic anhydride of the graft copolymer, in some cases we have found that a slight further improvement is obtained as the proportion of grafted maleic anhydride is increased to provide about 50 percent of the acid moieties. In general, above this level of grafted maleic anhydride little further singificant improvement occurs.

In the polymer composition comprising inorganic filler, crystalline propylene polymer, a boron-, sulphur- or phosphorus-containing acid or mixture of such acids and graft copolymer, satisfactory properties are obtained when the total of acid moieties present is in an amount as low as that provided by 0.01 percent by weight of maleic anhydride based on the polymer content of the composition, although it will be appreciated that this is dependent on the relative proportions of filler and crystalline propylene polymer, the nature of the filler, the type of graft copolymer and also the particular baron-, sulphur- or phosphorus-containing acid or mixture thereof used. Thus, it is preferred that the total amount of acid moieties is at least 0.01 percent by weight of the polymer content of the composition and for most systems the amount of total acid moieties is in the range 0.02 to 1.0 percent by weight of the polymer content of the composition. When the filler is glass fiber and a blend of acid and a maleic anhydride grafted copolymer is used, we have found that satisfactory mechanical properties are obtained with a total of acid moieties which is equivalent to that provided by 0.04 percent by weight of maleic anhydride and of which from 25 up to 80 percent by weight are present in the grafted maleic anhydride. Although satisfactory mechanical properties can be obtained at the same concentrations with most of the defined boron-, sulphur- or phosphorus-containing acids, it will be realised that the effectiveness of a given acid is dependent on the nature of the particular acid and the optimum level of the acid will be influenced by the acid actually being used. A different graft copolymer can be used to replace the maleic anhydride graft copolymer at the same concentration but, in this case also, the optimum level of the graft copolymer will be dependent on the particular acid or anhydride which is in grafted form and the effectiveness of any graft copolymer is more properly considered on the basis of the number of carboxylic acid groups present rather than the proportion by weight of the grafted acid or anhydride in the copolymer.

The present invention will now be described by reference to the following Examples which are illustrative of the invention but not limiting.

EXAMPLES 1 – 12

A masterbatch containing 4 percent by weight of a boron-, sulphur- or phosphorus-containing acid, based on the weight of the masterbatch, was prepared by mixing the acid, in solid form, and unstabilised crystalline polypropylene powder in a high speed mixer. When hyposphorus acid was used the masterbatch was prepared by adding the acid in the form of a 50 percent by weight aqueous solution and then drying the polymer powder in a vacuum oven at 50°C.

A graft copolymer of polypropylene and maleic anhydride containing 3.6 percent by weight of grafted maleic anhydride and a negligible proportion (less than 0.1 percent by weight) of free maleic anhydride, was blended in a high speed mixer with the polypropylene/acid masterbatch.

The blend thus obtained was then mixed with crystalline polypropylene powder and glass fiber by tumble blending to give a composition in which the level of grafter maleic anhydride was 0.01 percent by weight based on the weight of polymer and the glass fiber content was 20 percent by weight of the total composition. The glass fiber was 0.25 inch long chopped fiber of 0.0005 inch diameter and was coated with γ-aminopropyltriethoxy silane. The composition thus obtained was injection moulded at a temperature of 240°C to give tensile bars whose strengths were determined using ASTM Test D638-68 modified by using a temperature of 20°C and an extension rate of 1.0 inch per minute. The results obtained using various different acids are set out in Table 1 in which comparative results, using only the grafted polymer, or in the absence of any adhesive, are also detailed.

TABLE 1

| Example or Comparative Example | Acid Type | Proportion of acid in polymer (wt %) | Proportion of grafted maleic anhydride present in polymer (wt %) | Tensile strength (kilopounds sq. in.) |
|---|---|---|---|---|
| 1 | Phenylboric | 0.1 | 0.01 | 11.4 |
| 2 | Sulphamic | 0.06 | 0.01 | 12.6 |
| 3 | Sulphamic | 0.1 | 0.01 | 12.9 |
| 4 | Sulphanilic | 0.06 | 0.01 | 11.4 |
| 5 | Orthanilic | 0.1 | 0.01 | 11.9 |
| 6 | p-toluene sulphonic | 0.06 | 0.01 | 12.2 |
| 7 | Phenylhydrazine-p-sulphonic | 0.1 | 0.01 | 11.5 |
| 8 | Sulphosalicylic | 0.1 | 0.01 | 12.7 |
| 9 | d-10-camphor sulphonic | 0.1 | 0.01 | 11.5 |
| 10 | Hypophosphorous | 0.1 | 0.01 | 12.6 |
| 11 | Phenyl phosphonic | 0.04 | 0.01 | 12.1 |
| 12 | Diphenyl phosphinic | 0.13 | 0.01 | 11.6 |
| A | NIL | 0 | 0.01 | 10.9 |
| B | NIL | 0 | 0.04 | 13.3 |
| C | NIL | 0 | 0 | 7.3 |

It will be seen from Table 1 that the acids specified all gave an improvement in tensile strength of greater than 0.3 kilopounds/sq. inch (kpsi) compared to the result obtained using the graft copolymer alone at the same level of graft copolymer (see Comparative Example A). It will also be seen that some of the acids gave a tensile strength comparable with the result obtained using 0.04 percent of grafted maleic anhydride as the only adhesive (see Comparative Example B and Examples 2, 3, 8 and 10.

EXAMPLES 13 AND 14

The procedure described for Examples 1 to 12 was repeated using different acids. Naphthalene-2-sulphonic acid was added as a solid material whilst the phenylsulphinic acid was added as an aqueous solution in the same manner as the hypophosphorous acid. The results obtained are set out in Table 2.

TABLE 2

| Example or Comparative Example | Acid Type | Proportion of acid in polymer (wt %) | Proportion of grafted maleic anhydride present in polymer (wt %) | Tensile strength (kilopounds sq. in.) |
|---|---|---|---|---|
| 13 | Phenylsulphinic | 0.1 | 0.01 | 12.2 |
| 14 | Naphthalene-2-sulphonic | 0.1 | 0.01 | 11.6 |

TABLE 2-continued

| Example or Comparative Example | Acid Type | Proportion of acid in polymer (wt %) | Proportion of grafted maleic anhydride present in polymer (wt %) | Tensile strength (kilopounds sq. in.) |
|---|---|---|---|---|
| D | NIL | 0 | 0.01 | 10.7 |

We claim:

1. A polymeric composition comprising a blend of (a) a graft copolymer obtained by grafting an unsaturated dicarboxylic acid or the anhydride thereof onto a propylene polymer wherein the grafted acid or anhydride is present in an amount sufficient to give an acid moiety which is at least equivalent to that provided by 0.01 percent by weight of maleic anhydride, and (b) at least one acid selected from the group consisting of sulphur-containing acids of the formula $RSO_nH$ wherein 1-90 percent by weight of the acid moieties of the blend of (a) and (b) are present in the acid and/or anhydride component of the graft copolymer; and R is $NR'''_2$, a hydrocarbyl group, or a substituted hydrocarbyl group, and when the group is an aromatic group, any substituent containing an atom other than carbon, hydrogen or oxygen is located in a position which is other than meta- to the $-SO_nH$ group;

R''' is hydrogen or a hydrocarbyl group; and $n$ is 2 or 3.

2. The composition of claim 1 wherein from 25 up to 80 percent of the acid moieties of the blend of (a) and (b) are present as the acid and/or anhydride component of the graft copolymer.

3. The composition of claim 1 wherein component (b) is an acid selected from the group consisting of phenylhydrazine-p-sulphonic acid, sulphamic acid, p-toluene sulphonic acid, sulphosalicylic acid, d-10-camphor sulphonic acid, orthanilic acid, sulphanilic acid, phenylsulphinic acid and naphthalene-2-sulphonic acid.

4. The composition of claim 1 wherein the graft copolymer is the product of grafting maleic acid, itaconic acid, $\Delta^4$-3,6-endomethylene-tetrahydrophthalic anhydride, or maleic anhydride onto a propylene polymer.

5. A polymeric composition which comprises the composition of claim 1, a propylene polymer and an inorganic filler.

6. The composition of claim 5 wherein the inorganic filler is glass fiber coated with a silane containing at least one substituent which is reactive with the filler and at least one acid reactive organic substituent.

7. The composition of claim 5 wherein the amount of total acid moieties is in the range 0.02 to 1.0 percent by weight of the polymer content of the composition.

8. The composition of claim 5 wherein the component (b) is sulphamic acid or sulphonsalicylic acid.

9. The composition of claim 2 wherein component (a) contains 0.4 to 6 percent by weight of grafted maleic anhydride.

10. A process for the production of a polymeric composition which comprises mixing (a) a graft copolymer obtained by grafting an unsaturated dicarboxylic acid or the anhydride thereof onto a propylene polymer wherein the grafted acid or anhydride is present in an amount sufficient to give an acid moiety which is at least equivalent to that provided by 0.01 percent by weight of maleic anhydride, with (b) at least one acid selected from the group consisting of sulphur-containing acids of the formula $RSO_nH$ in proportions such that 1-90 percent by weight of the acid moieties of the mixture of (a) and (b) are present in the acid and/or anhydride component of the graft copolymer, and wherein R is $NR'''_2$, a hydrocarbyl group, or a substituted hydrocarbyl group, and when the group is an aromatic group, any substituent containing an atom other than carbon, hydrogen or oxygen is located in a position which is other than meta- to the $-SO_nH$ group;

R''' is hydrogen or a hydrocarbyl group; and $n$ is 2 or 3.

11. The process of claim 10 wherein a propylene polymer and an inorganic filler are also mixed with (a) and (b).

* * * * *